United States Patent [19]

Sato et al.

[11] 4,214,282
[45] Jul. 22, 1980

[54] TAPE RECORDER

[75] Inventors: Masanobu Sato; Kenzi Furuta, both of Hachioji, Japan

[73] Assignee: Olympus Optical Co., Ltd., Tokyo, Japan

[21] Appl. No.: 7,461

[22] Filed: Jan. 29, 1979

[30] Foreign Application Priority Data

Feb. 13, 1978 [JP] Japan .................................. 53/15242

[51] Int. Cl.² ...................... G11B 15/18; G11B 15/52; G11B 19/06
[52] U.S. Cl. ......................................... 360/69; 360/62; 360/71; 360/137
[58] Field of Search ............... 242/186, 188, 207, 208; 360/69, 71, 72.2, 73, 74.1, 74.4, 27, 51, 61–62, 137; 318/308–311, 316; 179/100.1 PS, 100.1 DR

[56] References Cited

U.S. PATENT DOCUMENTS

| 3,541,271 | 11/1970 | Joslow et al. | 360/71 |
| 3,745,531 | 7/1973 | Staas, Jr. | 360/69 |
| 3,950,735 | 4/1976 | Patel | 360/73 |

Primary Examiner—Alfred H. Eddleman

[57] ABSTRACT

A tape recorder is adapted to process at a different priority order by the same logic a magnetic tape run count function and time count processing function and includes a first logic register for counting a detection pulse which is outputted from a magnetic tape run detection section with a cycle enough longer than a maximum processing time required for the time count processing, the detection pulse being outputted during no time count processing time. A predetermined dummy count value is stored in a memory so as to count an interval between detection pulses which are outputted with an enough longer cycle. The dummy count value is supplied by a calculating circuit to said first register.

4 Claims, 19 Drawing Figures

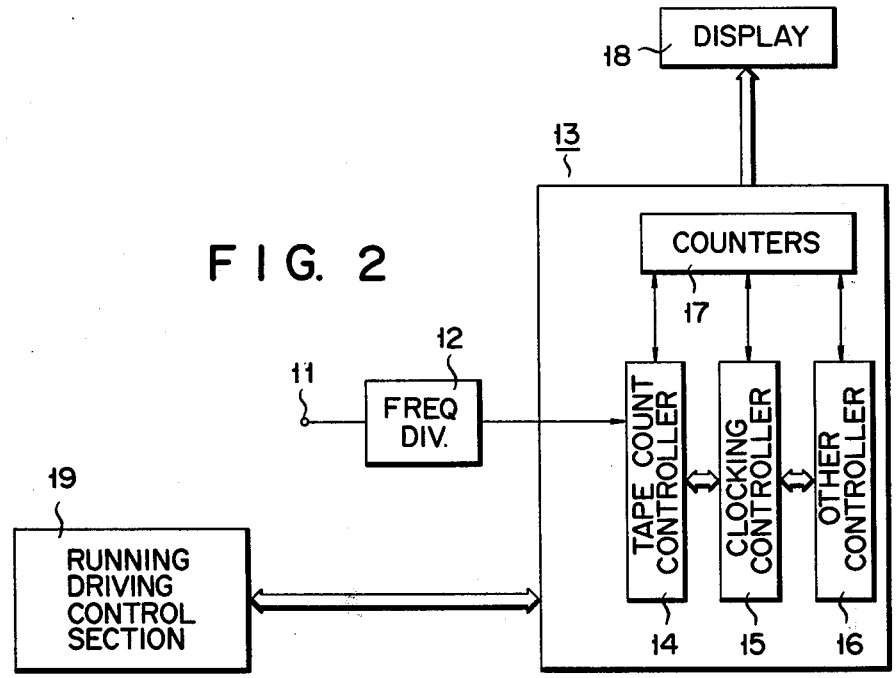

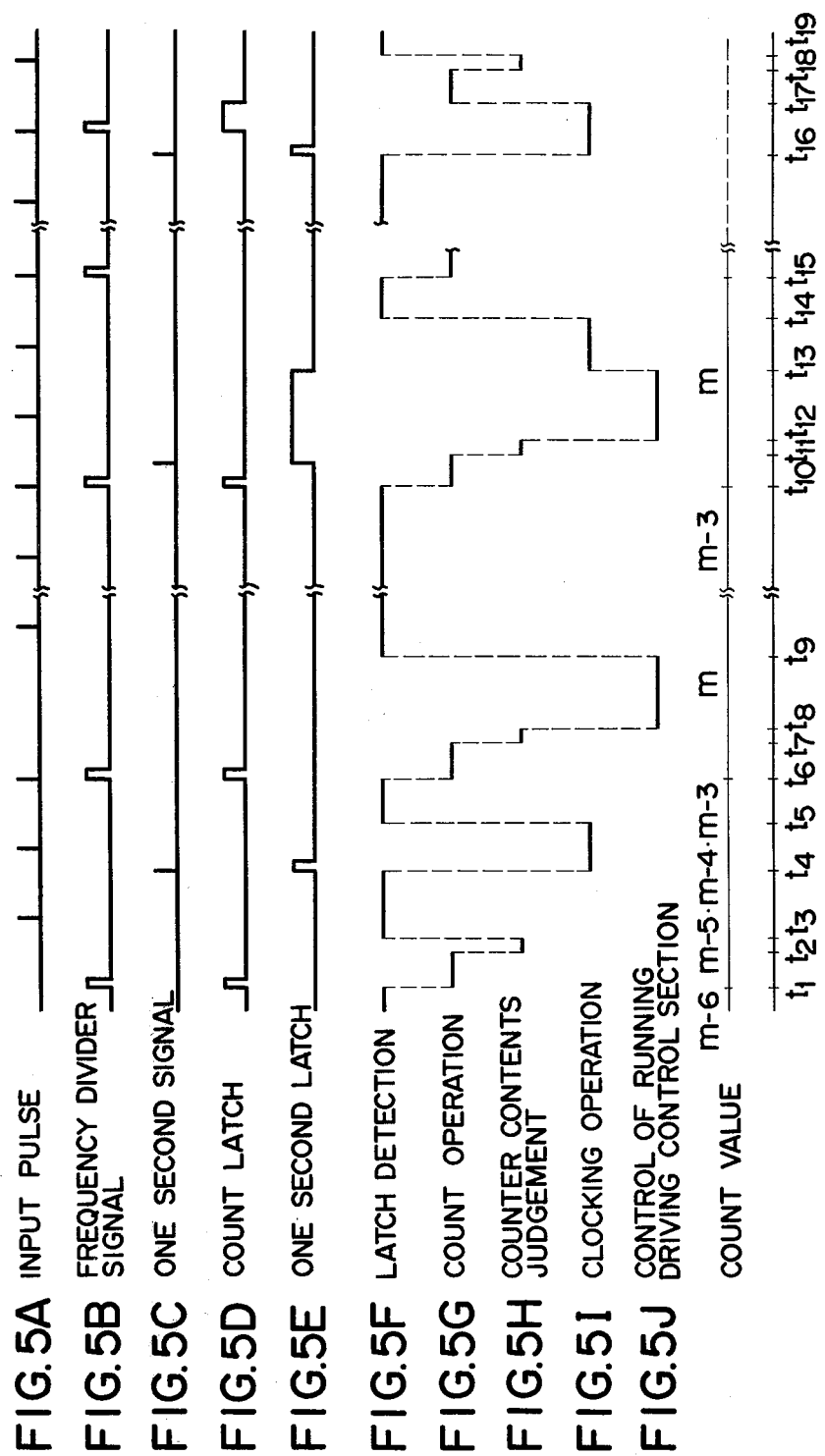

TAPE RECORDER

FIELD OF THE INVENTION

This invention relates to a tape run count display device in a cassette tape recorder etc.

BACKGROUND OF THE INVENTION

In recording/reproducing apparatus such as a cassette tape recorder etc. a run count of tape is displayed by a conventional, mechanical tape counter. Recently, an electron-optical display device has been contemplated or put to practice in which various data such as tape run data or time count data are simultaneously or selectively displayed. Where, in addition to tape run data, various data are to be displayed on the display section, it is necessary to simultaneously effect, in addition to the tape run counting, a time count operation for obtaining time count data on an operation for judging count contents (count zero) for stopping a motor at a beforehand preset tape run value. Suppose that these operations are performed by a sequential controller based on, for example, a microprogram. If in this case the tape is run at fast speed, a fast-speed count pulse is outputted, thereby affecting the other control function. This will lead to a miscount. If, for example, the time count process is set higher in priority level than the tape run count process, the tape run count process is not accepted during the time count process, since it is lower in priority level than the time count process. There is, therefore, a risk that pulses to be counted will be omitted. A longer pulse generating cycle is required not to generate tape run pulses during the time count process. If during the above-mentioned longer pulse generating cycle a tape run is displayed on the electronic count display device, a little irritation is accompanied due to such longer time interval, causing some inconvenience.

FIG. 1 shows a time chart of the conventional apparatus. A pulse output cycle shown in FIG. 1A bears a one-to-one correspondence with respect to the rotation cycle of a pinch roller or a reel shaft. When the pulse is generated, a time count section in the apparatus effects a count operation (FIG. 1B), count contents judging operations (FIG. 1C) etc. in synchronism with a rise of the above-mentioned pulse. Now suppose that the other operation such as a time count operation is effected. If in this case the pulse (FIG. 1A) is superposed with respect to the pulse of the time count process (see FIG. 1D), the time count section in the apparatus can not detect a new input pulse and it merely judges an input as shown in FIG. 1E. It will be understood upon comparison between the input (FIG. 1A) and the count pulse (FIG. 1E) that when a count value is shifted from "12" to "13" a count error occurs provided that the count value is started from "10". In order to prevent such erroneous operation the count function of the tape counter is separated from a circuit system for processing the other data and is operated independently. This method, however, involves an expensive, complicated circuit.

SUMMARY OF THE INVENTION

It is accordingly the object of this invention to provide a tape recorder having a count display device which can positively count input pulses without separating an input pulse count function section from the other data processing circuit system.

In order to attain the above-mentioned object there is provided a tape recorder comprising a run control section for controlling a tape mode such as recording, reproducing, rewinding, fast feeding etc, a multi-function logic section for counting a detection signal from a magnetic tape run detection section for detecting a magnetic tape run and a signal from a time count function section, and an electron-optical display device for displaying an output from the multi-function logic section, in which the multi-function logic section comprises first memory means for storing a microprogram for effecting a magnetic tape run process or a time count process based on the magnetic tape run detection signal for counting a run of the tape, second memory means connected to the first memory means to store a time count pulse or a tape run detection signal in a location designated by address data which, together with a microinstruction, is outputted from the first memory means, the address data being sent to the said second memory means through an address controller and the microinstruction being sent to said second memory means through an instruction decoder and address controller, calculating means connected to said memory means for causing data outputted from a predetermined location of the second memory means to be calculated based on the instruction decoder and for causing a predetermined numeral value to be added to the result of calculation when said data shows magnetic tape run detection signal and delivering an output signal to the electron-optical display device, address modifying means connected to said first memory means and said instruction decoder to modify the address of the location of said memory means, and means for decoding a signal delivered from said address modifying means.

BRIEF DESCRIPTION OF THE DRAWINGS

This invention will be further described by way of example by referring to the accompanying drawing sheets in which;

FIGS. 1A–1F show a time chart showing waveforms relating to the operation of conventional apparatus;

FIG. 2 is a block diagram showing one embodiment of this invention;

FIGS. 5A–5J show a time chart for explaining the operation of the multi-function logic section.

DETAILED DESCRIPTION OF THE PREFERRED EMBODIMENT

Figure 3:
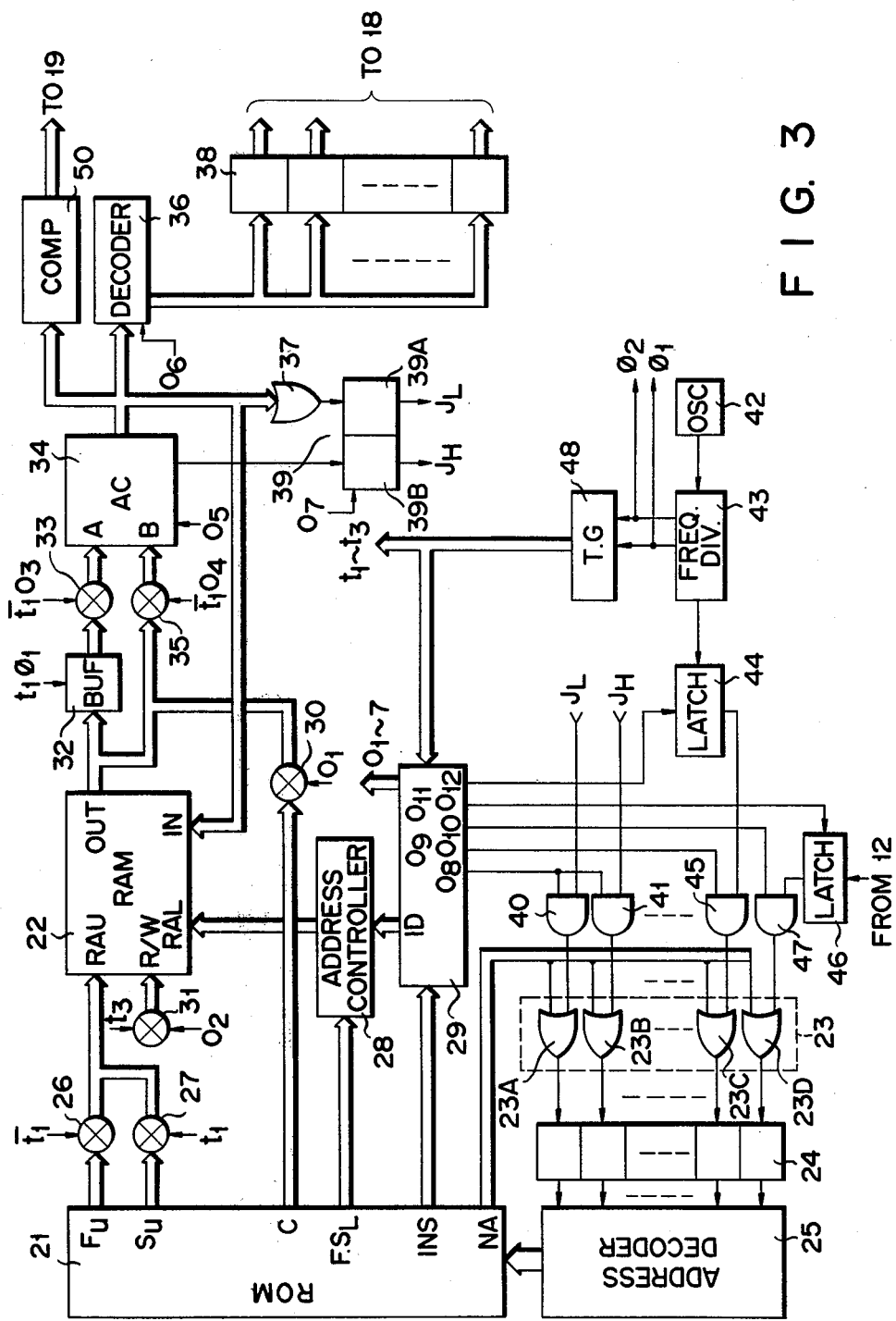
FIG. 3 shows a detail of a multi-function logic section of FIG. 2.

FIG. 2 shows a block diagram showing one embodiment of this invention. In FIG. 2 an input pulse, for example, an input pulse proportional to the run of a magnetic tape is inputted to an input terminal 11. The input pulse inputted to the input terminal 11 is sent to the multi-function logic section 13 through a 1/n frequency divider 12. The frequency divider 12 is set such that even the shortest cycle of an output signal thereof is enough longer than a unit processing time when the multi-function logic section 13 effects a process other than the calculation of the input pulse. The logic section 13 comprises a tape run count controller 14 for counting a run of the tape, a time count controller 15 for effecting a time count control, an other function controller for controlling the other function such as judgement, and counters 18 adapted to be controlled by control data outputted from the respective controllers 14, 15 and 16.

A trigger pulse outputted from the frequency divider 12 is supplied to the tape run count controller 14. When this occurs, the trigger pulse is temporarily stored in the controller 14. The tape run count controller 14 counts trigger pulses during the time period in which the time count controller 15 is not processed. In order to effect the continuous display of the tape run during the time period from the counting of the trigger pulse to the supply of the next trigger pulse, a predetermined value is supplied at this time to the count circuit as if dummy pulses were generated. This will be explained below in more detail.

The count circuit 17 includes, in addition to a tape run counter, a time counter etc. The contents of the respective counters in the count circuit 17 are properly selected for supply to a display section 18. The contents of the respective counters are displayed simultaneously or selectively. A run/drive control section 19 effects control of a tape run while effecting the supply and reception of control data to and from the logic section 13.

FIG. 3 shows a detail of the logic section 13 of FIG. 2.

A read-only memory (ROM) 21 stores a microprogram for controlling an operation of each circuit in the logic section 13. ROM 21 delivers as a parallel mode raw address designating signals Fu, Su to a later-described RAM 22, a numerical code designating signal C, column address designating signals F, $S_L$ for designating columns to which the processing of RAM 22 is directed, an instruction signal INS for various operations, and a next address signal NA for disignating a next address. The next address signal NA is supplied to an address decoder 25 through an address modifying circuit 23 and address buffer 24. The address decoder 25 designates an address designation of ROM 21 based on address data inputted.

A sequential control is effected by ROM 21 and address decoder 25 to respective circuits. The row address designating signals Fu and Su from ROM 21 are supplied to AND circuits 26 and 27, respectively, which are ON-OFF controlled by timing signals $\bar{t}_1$ and $t_1$. The column address designating signals F, $S_L$ are supplied to a column address controller 28 including, for example, an address counter for designating a column to which the processing is directed. An operation instruction INS is supplied to the instruction decoder 29, where it is decoded. The instruction decoder 29 delivers various control signals $O_1$ to $O_{12}$, and a control signal to the column address controller 28. A code signal C is supplied to an AND circuit 30. The AND circuit 30 is ON-OFF controlled by a control signal $O_1$ which is outputted from the instruction decoder 29.

RAM 22 comprises, for example, an A register for counting a run of the tape, N register for counting the number of times a predetermined number is added to the A register and B register for counting time. The designation of the respective registers is effected by causing the row address designating signal (Fu, Su) outputted from ROM 21 to be supplied to the input terminal RAU of RAM 22 to which the row address is supplied. The column address designating signals F, $S_L$ outputted from ROM 21 are applied to the column address controller 28. The column address outputted from the column address controller 28 is supplied to a column address input terminal RAL of RAM 22. The data of this address is outputted from an output terminal OUT based on the addresses which are supplied to the respective address input terminals RAU and RAL.

The output of the AND circuit 31 is also supplied as a read/write (R/W) control signal to RAM 22. A readout control is effected when a R/W signal is "0" and a write-in control is effected when the R/W signal is "1". A timing signal $t_3$ and control signal $O_2$ are applied to the AND circuit 31.

When data outputted from the output terminal OUT of RAM 22 shows the contents of the register designated by the row address designating signal, it is sent to one input terminal A of a calculating circuit 34 through a buffer 32 and AND circuit 33. A read-inclock $t_1 \cdot \phi_1$ is supplied to the buffer 32 and a open/close control signal $\bar{t}_1 \cdot O_3$ is applied to the AND circuit 33. When the data outputted from the output terminal OUT shows the contents of the register designated by the row address designating signal Fu, it is sent through an AND circuit 35 to the other input terminal B of the calculation circuit 34. A numeral code signal C outputted from ROM 21 is supplied through the AND circuit 30 to the AND circuit 35. The AND circuit 35 is controlled by a open/-close control signal $\bar{t}_1 \cdot O_4$. The numerical code signal C is supplied to the other input terminal B of the calculating circuit 34. The calculating circuit 34 comprises an adder for executing a calculation such as addition or subtraction and a peripheral circuit. The calculating circuit 34 is controlled by a control signal $O_5$. The calculating circuit 34 calculates data inputted into the input terminals A, B thereof and delivers a carry/borrow signal. Data outputted from the calculating circuit 34 is sent to a data input terminal IN of RAM 22 and also to an output decoder 36, comparator 50 and OR gate 37. The above-mentioned R/W signal, when it is "1", is written into the data input terminal IN of RAM 22. The address data is written into RAM 22 by the same address designation as the above-mentioned readout operation.

The comparator 50 compares data sent from the calculation circuit 34 and a beforehand preset value (for example, a tape run value, time value etc.) and, when a coincidence occurs, a control signal such as a motor stop signal is supplied to the run/drive control section 19. The output decoder 36 converts the output data to display data for supply to the display buffer 38. A display buffer 38 comprises a plurality of buffers each of which is provided to a corresponding display digit. The output of the display buffer 38 is sent to the display section 18 through a predetermined display processing circuit not shown. The output of the OR circuit 37 is supplied to a "data side" latch 39A of a latch circuit 39 for judgement. A carry/borrow signal outputted from the calculating circuit 34 is supplied by a control signal $O_7$ to a "carry/borrow side" latch 39B of the latch circuit 39. The output signals $J_L$ and $J_H$ of the latches 39A and 39B are supplied respectively through AND gates 40 and 41 to OR gates 23A and 23B of the address modifying circuit 23. The next address NA outputted from ROM 21 is mofified by the signals $J_L$ and $J_H$. AND gates 40 and 41 are controlled by an open/close control circuit $O_8$.

An oscillator 42 is constructed of, for example, a crystal oscillator and delivers a fundamental frequency for time counting. The output of the oscillator 42 is applied to a frequency divider 43. The frequency divider 43 delivers a one pulse per second signal to a latch circuit 44. The latch circuit 44 stores the one pulse per second signal. The output of the latch circuit 44 is supplied through an OR circuit 45 to an OR gate 23c in the address modifying circuit 23. As a result, the next address signal NA outputted from ROM 21 is modified by the next address signal NA. The AND circuit 45 is controlled by a control signal $O_9$. The output of the frequency divider 12 is supplied to a count latch circuit 46 to cause the latter to be set. The count latch circuit 46 has the same function as the latch circuit 44 and the output of the latch circuit 46 is supplied to an OR gate 23D of the address modifying circuit 23 through an AND gate 47 which is controlled by the control signal $O_{10}$ in the ON-OFF fashion. As a result, the next address signal NA is supplied to the OR gate 23D. The above-mentioned latches 44 and 46 are reset by control signals $O_{11}$ and $O_{12}$, respectively. The frequency divider 43 delivers clock pulses $\phi_1$ and $\phi_2$ to the corresponding circuits and also to a timing signal generating circuit 48. The timing signal generating circuit 48 delivers the timing signals $t_1$, $t_2$ and $t_3$ by the inputted clock signals $\phi_1$ and $\phi_2$. The timing signals $t_1$, $t_2$ and $t_3$ are sent to corresponding circuits and also to the instruction decoder 29.

The reason why the timing signal generating circuit 48 delivers the timing signals $t_1$ and $t_3$ is because that RAM 22 is operated in three phases as shown in Table-1.

Table 1

| | |
|---|---|
| $t_1$ | first register readout |
| | Su, F . $S_L$ |
| $t_2$ | second register readout |
| | calculation |
| $t_3$ | Fu, F. $S_L$ |
| | result → written |

The operation of the tape run count display device will be explained below by referring to FIGS. 4 and 5.

Figure 4:
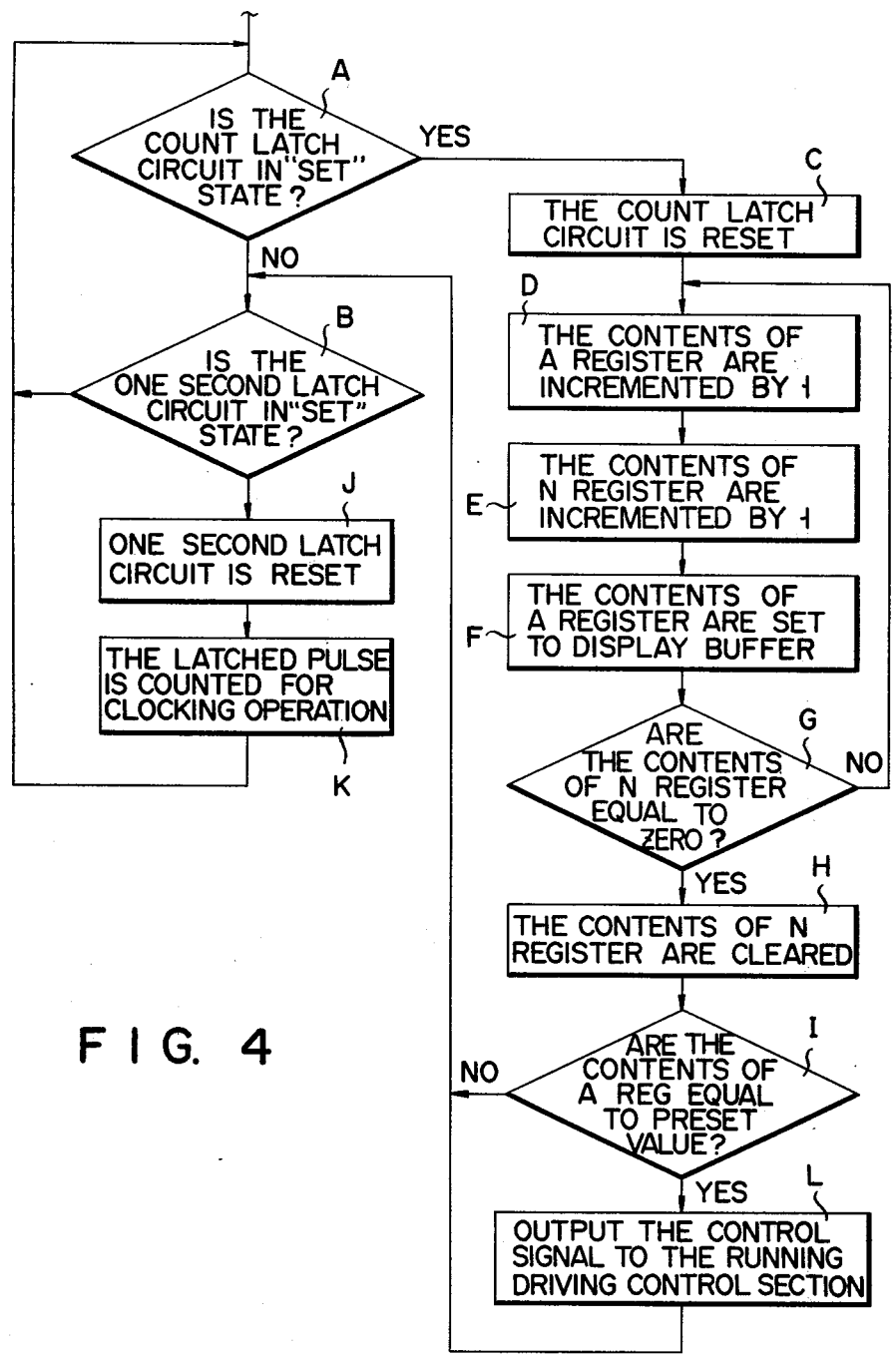
FIG. 4 shows a flow chart for explaining an operation of the multi-function logic section.

In FIG. 4, at step A the set or reset state of the latch circuit 46 is detected. A control signal $O_{10}$ is supplied from the instruction decoder 29 to one input terminal of the AND circuit 47 and an output signal from the latch circuit 46 is supplied to the other input terminal of the AND circuit 47. The output of the AND circuit 47 is supplied to one input terminal of the OR circuit 23D and the next address signal NA is applied to the other input terminal of the OR circuit 23D. Suppose that the next address signal NA is set to "0". In this case, the output signal of the OR circuit 23D becomes "1" when the output signal of the AND circuit 47 is "1" and the output signal of the OR circuit 23D becomes "0" when the output signal of the AND circuit 47 is "0". Suppose that a control signal $O_{10}$ outputted from the instruction decoder 29 is "1". When in this case the latch circuit 46 is set, the AND circuit 47 delivers an output "1" and thus the address modification is effected. With the latch circuit 46 in the reset state the AND circuit 47 delivers an output "0" and thus the next address NA is not modified.

At step B the set or reset state of the latch circuit 44 is detected. When a control signal $O_9$ outputted from the instruction decoder 29 is applied to one input terminal of the AND circuit 45 and an output signal from the latch circuit 44 is applied to the other input terminal of the AND circuit 45, the output of the AND circuit 45 is applied to one input terminal of the OR circuit 23C and the next address signal from ROM 21 is supplied to the other input terminal of the OR circuit 23C. With the latch circuit 44 in the set state, address modification is effected and with the latch circuit 44 in the reset state no address modification is effected. In the latter case, the process goes back to step A. Such process is repeated until address modification is effected at step B.

When at time $t_1$ an output is delivered as shown in FIG. 5B the latch circuit 46 is set as shown in FIG. 5D. As a result, a count process is carried out at steps (C to F) as shown in FIG. 5G.

At step C, a reset control signal $O_{11}$ is outputted from the instruction decoder 29 to cause the latch circuit 46 to be reset.

At step D, a row address designating signal Su outputted from ROM 21 delivers a row address of the A register and a code signal C having a level "1" is outputted. ROM 21 delivers column address designating signals F, $S_L$ to designate columns 1 to 4 to which a process is directed. ROM 21 also delivers an operation command INS for designating addition.

In consequence, the contents (for example, m−6) of the A register are read out of the data output terminal OUT of RAM 22 and they are supplied at time $t_3$ to the input terminal A of the calculating circuit 34 through the buffer 32 and AND circuit 33 and at time $t_2$ to the input terminal B of the calculating circuit 34 through the AND circuit 35. The code signal "1" is supplied to the input terminal B of the calculating circuit 34 through the AND circuits 30 and 35. The calculating circuit 34 calculates the data "m−6" from the output terminal OUT of RAM and the code signal "1" upon receipt of a control signal $O_5$ which is outputted from the instruction decoder 29 to designate addition. The result of addition "m−5" is supplied back to the data input terminal IN of RAM 22. It is stored in the A register of RAM 22.

At step E the contents of the N register of RAM 22 is incremented by "1" ("−3" is set as an initial value to the N register). A process at step E is effected in the same way as in step D. The N register of RAM 22 increments the contents of the A register of RAM 22 at a predetermined value n with respect to the output pulse of the frequency divider when the output pulses from the frequency divider are counted. The value n may be set desirably. The value may be set, for example, taking the frequency division ratio into consideration. In this embodiment the frequency division ratio of the frequency divider 12 is set to "⅓" and a ratio 1/n of the output pulse of the frequency divider 12 to the count value is set to ⅓. In consequence, the contents of the A register are stepped three times in increments of one during the time period from the supply of a trigger pulse of the frequency divider 12 to the supply of the next trigger pulse.

At step F, the contents of the A register which are renewed at step D are sent to the display buffer 38. The contents of the A register are read out of the data output terminal OUT of RAM 22 in the same way as in step D. The contents "m−5" of the A register are supplied to the output decoder 36 through the buffer 32, AND circuit 33 and calculating circuit 34. The data "m−5" inputted into the output decoder 36 is converted to display data for supply to the display buffer 38. The display device 16 continues to be displayed until the data "m−5" is renewed.

At step G the contents of the N register is read out of RAM 22 to judge whether or not it is zero or not. That is, when the contents of the N register is zero, it is meant that the contents of the A register have been incremented three times. The process goes to step H. When the contents of the A register are not zero, the process at steps D to F is repeated. When the process at steps D to G is effected the contents of the A register is sequentially stepped in increments of "1" and the contents of the N register is sequentially stepped in increments of "1".

At step H the contents of the N register is set back to the initial value "−3" and at step I the judgement of count values for the stopping of the motor is effected. The contents (for example, m−3) of the A register is compared at the comparator 50 with the data (for example, m) which is beforehand preset. The process goes to step B because noncoincidence occurs as a result of comparison.

If at step B the latch circuit 44 is not yet set at this time the latch state detection operation for repeating step A and step B in the same way as mentioned above is repeated. When at time $t_4$ a one pulse per second signal is outputted, as shown in FIG. 5C, during the latch state detection operation the latch 44 is set as shown in FIG. 5E. The set state of the latch 44 is set at step B. The output signal of the latch circuit 44 is supplied through the AND circuit 45 to the OR circuit 23C of the address modifying circuit. In consequence, the time count process is effected, as shown in FIG. 5I, at steps J and K.

At step J a control signal Ou is delivered from the instruction decoder 29 to the latch circuit 44. In consequence, the latch circuit 44 is reset.

At step a "plus 1" second calculation is effected with respect to time count data stored in the B register of RAM 22 and a conversion process for obtaining time data based on a scale of, for example, 60, 12 or 24 is effected.

When at time $t_5$ the process at step K is completed, it goes back to step A and the latch state detection operation for repeating the process at steps A and B is effected.

At time $t_6$ a trigger pulse is outputted, as shown in FIG. 5B, from the frequency divider 12 and the output of the latch circuit 46 is set as shown in FIG. 5D. As a result, the judgement of step A is YES and a count process at steps C and G is effected, as shown in FIG. 5G, in the same operation as mentioned above. When the data "m" is written into the A register of RAM 22 and also sent to the display section 18.

When a series of calculation processes is completed the count contents are judged at step I as shown in FIG. 5H. The contents of the A register of RAM 22 and the beforehand preset value are both "m" and thus coincidence occurs. The process goes to step L.

At step L various processes for outputting a control signal for the tape run step etc. with respect to the nun/drive control section are effected. The control signal is decoded at the output decoder 36 are sent to the run/drive control section 19. When at step L the process is completed, a return to step B is effected at time $t_9$ and the latch state detection operation at steps A and B are carried out.

Now suppose that where the maximum process time is required (hour, minutes or seconds are calculated, for example, in the count process) a one pulse per second signal is outputted from the frequency divider 43.

When, during the latch state detection operation (time $t_{10}$) at steps A and B, a trigger pulse is outputted from the frequency divider 12 the latch circuit 46 is set as shown in FIG. 5D. In consequence, the count process at steps C to G is carried out.

Suppose that the count time up to time $t_{10}$ is "m−3" and it becomes "m" through the time count process. If at this time a one pulse per second signal is outputted, as shown in FIG. 5C, from the frequency divider 43 during the count process the latch circuit 44 is set as shown in FIG. 5E.

At time $t_{11}$, the counts at step G are judged as shown in FIG. 5H and the result of judgement is "YES" in the same way as at time $t_7$ and the process at step L is executed at time $t_{12}$ to $t_{13}$ and goes back to step B.

At step B the set state of the one pulse per second signal is judged by the same operation as mentioned aobve. Since the set state of the latch circuit 44 is set as shown in FIG. 5E the result of judgement is "YES" as shown in FIG. 5E and a time count process at steps J and K is effected (time $t_{13}$ to $t_{14}$) and goes back to step A.

At time $t_{15}$ a trigger pulse is delivered from the frequency divider 12 and the latch state detection operation at steps A and B is effected until the latch circuit 46 is outputted.

Suppose that a one pulse per second signal is outputted and during the time count operation execution period a trigger pulse is outputted from the frequency divider 12.

When at time $t_{16}$ the one pulse per second signal is outputted from the frequency divider as shown in FIG. 5C the latch circuit 44 is set as shown in FIG. 5E and the time count process at steps J and K is effected as shown in FIG. 5I. When during this time count process period a trigger pulse is outputted as shown in FIG. 5B the time count latch circuit 46 is set as shown in FIG. 5D.

When at time $t_{17}$ the process proceeds from step L to step A the set state of the latch circuit is judged. The result of judgement is YES and the count process and time count process based on the trigger pulse are effected at time $t_{17}$ to $t_{19}$ (FIGS. 5G to 5H) with a slight delay with respect to the trigger pulse which is outputted from the frequency divider 12.

According to this invention the count input pulse is frequency divided into a pulse with a period enough longer than the unit process time of the multifunction logic section 13 and it is subjected at a predetermined ratio to count process. Even if a process requiring a minimum process time is effected the process is effected within one output cycle of the frequency divider 12 and no count error occurs.

The latch circuits 46 and 44 for holding the outputs of the frequency dividers 12 and 43, respectively, are provided and the outputs of the latch circuits 46 and 44 are held until the respective processes are started. Even if both the outputs are time-coincident with each other a sequential control can be effected based on one microprogram.

Although in the above-mentioned embodiment an input pulse is frequency divided by the frequency divider 12 it can be done by the other electric means or a mechanical means. In the above-mentioned embodiment, when the pulse signal from the frequency divider 12 is outputted the time counting is effected at a predetermined ratio. For example, a dummy pulse generator can be provided. In this case, during no time count processing time in which a pulse signal is outputted from the frequency divider 12 a preset number of dummy pulses are outputted from the dummy pulse generator. The dummy pulses, together with the nondummy pulses from the frequency divider 12, are counted.

What we claim is:

1. A tape recorder including a run/drive control section for controlling a tape mode such as recording, reproducing, rewinding or fast feeding, a multi-function logic section for processing at a different priority order a magnetic tape run count function for counting a signal from a magnetic tape run detection section for detecting a magnetic tape run and a time count processing function for counting a signal from the time count function section, and an electron-optical display device for displaying an output from the multi-function logic section, in which said multi-function logic section comprises:

first memory means for storing a microprogram for effecting a magnetic tape run process or a time count process based on said magnetic tape run detecting signal and predetermined data necessary for the process;

second memory means connected to said first memory means for defining a location by address data outputted through an address controller from said first memory means, for effecting a read/write operation by an instruction signal outputted from said first memory means and for storing a time count pulse and said tape run detection signal;

calculating means connected to said second memory means for outputting data from a predetermined location of said second memory means, for calculating data from said predetermined location of said second memory means based on data which is outputted from said instruction decoder and for, when said data is a magnetic tape run detection signal, adding a preset numeral value and outputting a result of addition to the electron-optical display device;

address modifying means connected to said first memory means and said instruction decoder to modifying the address of the location of said first memory means;

and decoding means for decoding a signal outputted from said address modifying means.

2. A tape recorder according to claim 1, in which said first means is constructed of a read only memory.

3. A tape recorder according to claim 1, in which said second memory means is constructed of a random access memory.

4. A tape recorder according to claim 1, in which said calculating means has a preset value and includes means for comparing said preset value and a tape run value stored in said second memory.

* * * * *